United States Patent [19]

Heichberger

[11] Patent Number: 4,639,262

[45] Date of Patent: Jan. 27, 1987

[54] METHOD AND APPARATUS FOR CARBON DIOXIDE LIQUEFACTION AND EVAPORATION

[76] Inventor: Albert N. Heichberger, 10960 Beach Blvd. 190 313, Jacksonville, Fla. 32216

[21] Appl. No.: 818,993

[22] Filed: Jan. 13, 1986

Related U.S. Application Data

[63] Continuation of Ser. No. 622,217, Jan. 19, 1984, which is a continuation-in-part of Ser. No. 568,717, Jan. 6, 1984, Pat. No. 4,572,728, which is a continuation-in-part of Ser. No. 511,270, Jul. 6, 1983, Pat. No. 4,498,303.

[51] Int. Cl.$^4$ .................................. F25J 3/02
[52] U.S. Cl. .................................. 62/11; 62/21; 62/37; 62/54
[58] Field of Search ............ 62/9, 10, 11, 21, 36, 62/37, 45, 54

[56] References Cited

U.S. PATENT DOCUMENTS

| | | | |
|---|---|---|---|
| 2,608,838 | 9/1952 | Rupp | 62/10 |
| 3,469,410 | 9/1969 | Schramm et al. | 62/10 |
| 3,984,993 | 10/1976 | Muska | 62/10 |

OTHER PUBLICATIONS

Elonka et al., Std. Refrig. & Air Cond. Questions & Answers, McGraw Hill, 1961, pp. 154-155.
Ammonia-Cooled & Self Contained 2 Stage, Independent CO2 Liquefying System: Bulletin 3CSA 10/4.
Freon-Cooled CO2 Liquefying System: Bulletin 3CBF 10/4.
Ammonia Booster-Type CO2 Liquefying System: Bulletin 3CBA 10/4.
Cold Temp. Vaporizer: Bulletin CTV 3B5.
Electrically-Heated CO2 Vaporizer: Bulletin EHV 1/5.
Water-Heated CO2 Evaporizer: Bulletin WHV WH5H3.
CO2 Steam Vaporizer: no bulletin.
A. N. Heichberger, "New Carbonic Liquefier Developed in Florida", Brewers Digest 59:2, Feb. 1984.

*Primary Examiner*—Frank Sever
*Attorney, Agent, or Firm*—Jones & Askew

[57] ABSTRACT

There is provided a method for liquefying carbon dioxide gas containing contaminating gas having a lower condensation temperature than that of carbon dioxide, comprising introducing a source flow of carbon dioxide gas containing contaminating gas into a chamber of liquid carbon dioxide at a temperature and pressure to selectively condense carbon dioxide from the source flow, while permitting the contaminating gas to escape from the liquid carbon dioxide; and passing a coolant flow of liquid carbon dioxide in heat exchange relation with the chamber while flashing the coolant flow to maintain the heat exchange relation. Advantageously, the condensed source flow is merged into the liquid coolant flow, and the flashed coolant flow is regulated to maintain a selectively reduced pressure so as to control the temperature of flashing. Contaminating gas collected in the hot path of the exchanger is selectively released to control pressure therein. Apparatus for practicing the method is also disclosed.

18 Claims, 1 Drawing Figure

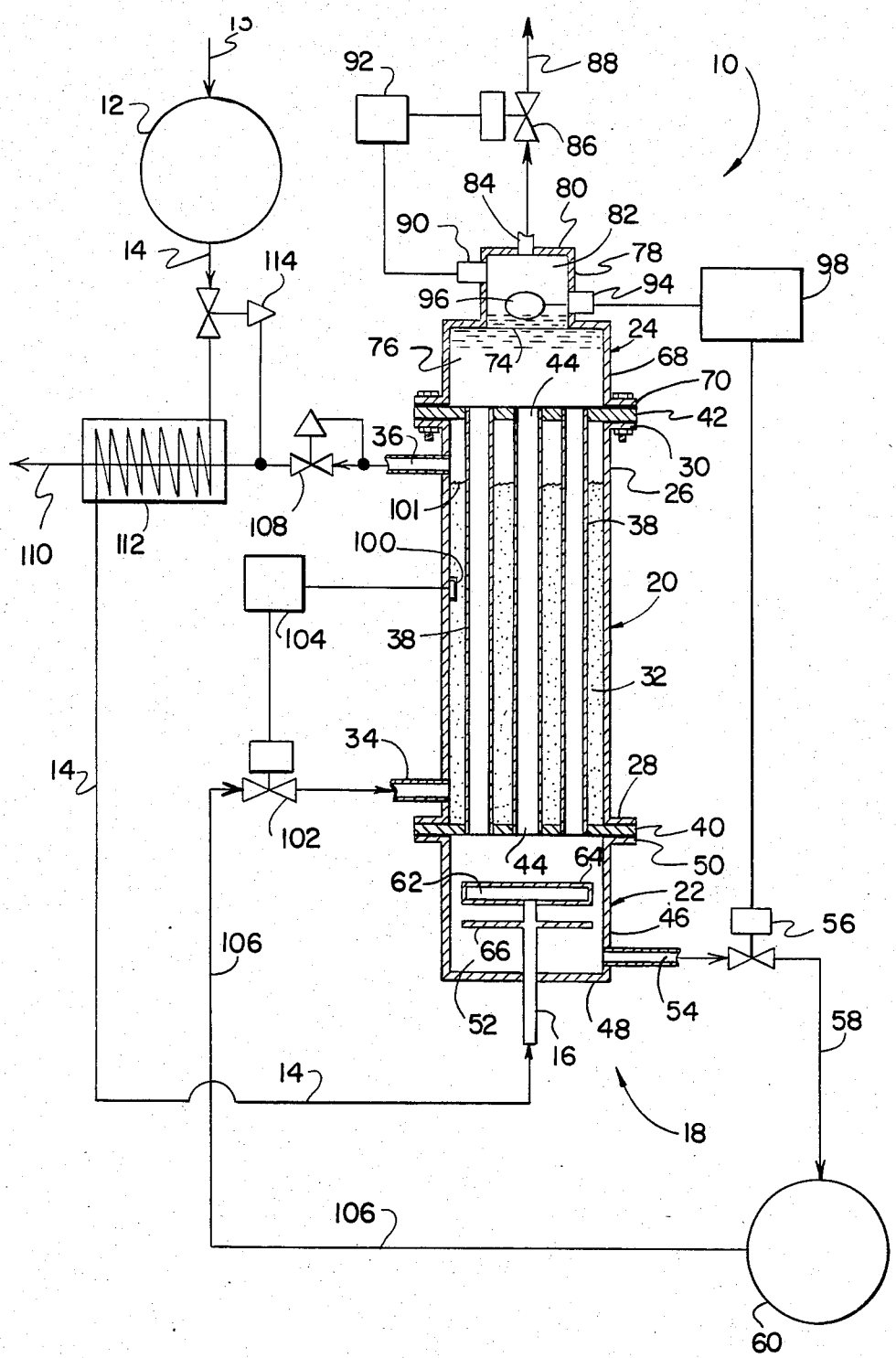

METHOD AND APPARATUS FOR CARBON DIOXIDE LIQUEFACTION AND EVAPORATION

CROSS-REFERENCE TO RELATED APPLICATIONS

This is a continuation of U.S. application Ser. No. 622,217, filed Jan. 19, 1984, pending, which is a continuation-in-part of application Ser. No. 568,717, filed Jan. 6, 1984, now U.S. Pat. No. 4,572,728, which is a continuation-in-part of U.S. application Ser. No. 511,270, filed July 6, 1983, now U.S. Pat. No. 4,498,303 which are both incorporated herein by reference.

TECHNICAL FIELD

This invention relates generally to liquefaction and evaporation of carbon dioxide and relates more particularly to a process and apparatus for liquefying a flow of relatively impure carbon dioxide gas in conjunction with providing a carbonation flow of relatively pure carbon dioxide gas.

BACKGROUND OF THE INVENTION

Liquefied carbon dioxide has many applications, but is particularly useful in the beverage industry for carbonating beverages, such as beer and soft drinks. However, for the carbon dioxide to be of maximum usefulness, it must be relatively pure, i.e. free of contaminating gas such as oxygen and to a lesser extent nitrogen. If the carbon dioxide contains a significant amount of oxygen, the beverage in which it is used will be subject to oxidation and spoilage.

Various methods of liquefying gaseous carbon dioxide are well known. Typically, the liquefaction process comprises compressing the gaseous carbon dioxide to a pressure above atmospheric pressure and then removing the latent heat of vaporization to condense the compressed gas. In this way, although the sublimation temperature of solid carbon dioxide is approximately $-109°$ F. at STP, the compressed gaseous carbon dioxide can be condensed at much higher temperatures. The theoretical range of pressures over which gaseous carbon dioxide can be condensed to a liquid is approximately 60.45 to 1057.4 psig. Typically, such commercial processes operate in the range of approximately 225 to 300 psig. For example, in this range, the temperature at which gaseous carbon dioxide will condense is $-14°$ F. at 225.25 psig and $-8°$ F. at 251.96 psig.

Since the carbon dioxide gas also contains contaminating gas with a lower temperature of condensation, and a different latent heat of vaporization, the contaminating gas requires a lower temperature and a different amount of heat removal to condense than does the carbon dioxide gas. Therefore, the carbon dioxide will condense before admixed contaminating gases, such as oxygen and nitrogen, will condense. The contaminating gas will therefore remain in a gaseous state, whereas the carbon dioxide will liquefy.

In typical liquefaction apparatus, gaseous carbon dioxide is passed through a tube which is surrounded by a refrigerant. The carbon dioxide condenses on the inside of the tube and collects in the bottom thereof. The temperature of the refrigerant must therefore be below the condensation temperature of carbon dioxide, but greater than the condensation temperature of the contaminating gas. The contaminating gas is separated from the liquid carbon dioxide in a gas separation chamber.

In typical use, a supply of relatively pure liquid carbon dioxide obtained as above is vaporized and directed to a beverage carbonation process. Disadvantages result from the conventional approach of carrying out separately the liquefaction and evaporation processes in terms of the number of processing steps, energy requirements and the extent of apparatus required.

SUMMARY OF THE INVENTION

Broadly, in the process aspects of the invention, there is provided a method for liquefying carbon dioxide gas containing contaminating gas having a lower condensation temperature than that of carbon dioxide, which includes the steps of introducing a source flow of carbon dioxide gas containing the contaminating gas into a chamber of liquid carbon dioxide at a temperature and pressure sufficient to selectively condense carbon dioxide from the source flow, while permitting contaminating gas to escape from the liquid carbon dioxide; and passing a coolant flow of liquid carbon dioxide in heat exchange relation with the chamber while flashing the coolant flow to maintain the heat exchange relation.

In an especially advantageous mode, the method further includes removing a quantity of liquid carbon dioxide from the chamber to control the amount therein, then merging the removed quantity into the liquid coolant flow. Pressure is preferably controlled in the chamber by selective release of contaminating gas collected above the purified liquid carbon dioxide.

Preferably, the method further includes regulating the flashed coolant flow to maintain a selectively reduced pressure in the coolant flow so as to control the temperature of flashing and the rate of heat exchange.

Broadly, in the apparatus aspects of the invention, there is provided apparatus for liquefying carbon dioxide gas containing contaminating gas having a lower condensation temperature than that of carbon dioxide, which includes a heat exchanger with the inlet of its hot path being arranged to receive a source flow of carbon dioxide gas containing contaminating gas, and with the inlet of its cold path being arranged to receive a coolant flow of liquid carbon dioxide; a controller for operating the cold path of the exchanger as a carbon dioxide flash chamber; and a controller for maintaining the hot path of the exchanger substantially filled with liquid carbon dioxide at a pressure to selectively condense carbon dioxide from the source flow passing therethrough.

In an especially advantageous embodiment, the apparatus further includes means for regulating the flow of liquid carbon dioxide from the outlet of the hot path to control the amount therein, and for directing the flow to the cold path inlet.

Preferably, the apparatus includes a regulator to control the flashed coolant flow to maintain a selectively reduced pressure in the coolant flow so as to control the temperature of flashing, and a regulator to control hot path pressure by selectively releasing collected contaminating gas.

Accordingly, it is an object of the present invention to provide an improved carbon dioxide liquefaction system.

It is another object to provide a process for liquefaction of carbon dioxide in a carbonation system.

It is another object to provide a unitary system for the production of a carbonation stream directly from a source of relatively impure carbon dioxide gas.

By providing such a unitary system, the invention eliminates need for intermediate conventional refrigeration apparatus during liquefaction of carbon dioxide gas by utilizing as a refrigerant evaporating liquid carbon dioxide in a carbonation process. Advantageously, the source carbon dioxide, after liquefaction and separation from noncondensed contaminating gases, is merged into the evaporating liquid carbon dioxide acting as a refrigerant. Thus, a relatively pure carbonation stream is provided directly from a source of relatively impure carbon dioxide gas.

These and other objects, features and advantages of the present invention will become apparent after a review of the following detailed description of the disclosed embodiment and the appended drawing and claims.

BRIEF DESCRIPTION OF THE DRAWINGS

The drawing is a cross-sectional schematic view of a disclosed embodiment of the carbon dioxide liquefaction apparatus of the present invention.

DESCRIPTION OF THE PREFERRED EMBODIMENTS

In the drawing, there is shown a preferred embodiment 10 of the invention wherein a flow of relatively impure carbon dioxide gas is liquefied in conjunction with providing a carbonation flow of relatively pure carbon dioxide gas. At the reservoir 12, there is indicated a source of relatively impure carbon dioxide gas containing relatively minor amounts of contaminating gases, such as oxygen and nitrogen, having substantially lower condensation temperatures than that of carbon dioxide. The embodiment 10 will typically be used to advantage in a brewery carbonation process so that source 12 is continuously replenished by off gas 13 from fermentation tanks (not shown). The source 12 is in flow communication along line 14 with hot path inlet 16 of heat exchanger 18.

The heat exchanger 18 includes three sections: a central cooling section 20, a lower inlet section 22 and an upper collection section 24. Although the heat exchanger 18 is shown in a vertical orientation, it is specifically contemplated that a heat exchanger in accordance with the invention can be provided at various inclinations.

The central cooling section 20 comprises a hollow annular shell 26 having outwardly extending flanges 28, 30 at each end thereof. The shell 26 partially defines a coolant chamber or cold path 32 for containing the process coolant.

Extending through the shell 26 and sealed thereto are two pipes 34, 36 which are in fluid communication with the chamber 32 and are respectively the cold path inlet and outlet. Within the cold path or coolant chamber 32, the liquid coolant boils, thereby absorbing heat from its surroundings. The expanded coolant gas is then vented from the chamber 32 by the outlet pipe 36.

Extending longitudinally through the cold path chamber 32 are a plurality of pipes or tubes 38. The tubes 38 are connected at their lower end to a plate or tube sheet 40 and at their upper end to a plate or tube sheet 42. Holes 44 are provided through the tube sheets 40, 42 at their juncture with the tubes 38 so that fluid communication through the tube sheets from within the tubes and the side of the tube sheets opposite the tubes is possible. The tube sheets 40, 42 are constructed so that they seal against the flanges 28, 30 respectively and that provide an air tight seal therewith. Furthermore, the tube sheets 40, 42 define the lower and upper ends of the chamber 32.

The lower inlet section 22 comprises a lower annular sleeve 46 sealed at its lower end by a plate 48 and having outwardly extending flanges 50 at its other end. The tube sheet 40 and the flanges 50 are constructed so that an air tight seal is provided therebetween. The lower sleeve 46, and the plates 40, 48 define a lower chamber 52. Connected to the lower sleeve 46 is one end of a pipe 54 which is in fluid communication with the lower chamber 52 and which defines the hot path outlet of the exchanger 18. The other end of the pipe 54 is connected to a conventional electrically or pneumatically operated modulating type control valve 56. Connected to the other side of the valve 56 is a flow line 58 which is connected at its other end to a conventional liquid carbon dioxide storage tank or reservoir 60.

Extending through the lower end plate 48 and sealed thereto is the pipe 16 which defines the hot path inlet of the exchanger 18. One end of the pipe is connected to a sparger or gas distributor 62. The gas distributor 62 comprises a hollow plate having a plurality of holes formed in the upper surface 64 thereof so that gas within the distributor can escape therethrough. As discussed above, the other end of the pipe 16 is connected to the supply 12 of gaseous carbon dioxide under pressure via flow line 14. Disposed on the pipe 16 intermediate the end plate 48 and the distributor 62 is a baffle plate 66.

The upper collection section 24 of the heat exchanger 18 comprises an upper annular sleeve 68 having an outwardly extending flange 70 at its lower end. The tube sheet 42 and the flange 70 are constructed so that an air tight seal is provided therebetween. Attached to the upper end of the upper sleeve 68 is a plate 72 having formed centrally thereof a hole 74. The sleeve 68, the tube sheet 42 and plate 72 define an upper chamber 76.

Attached in sealing engagement with the upper surface of the plate 72 and coaxially aligned with the hole 74 is a sleeve 78. The sleeve 78 is sealed at its upper end by a plate 80. The sleeve 78 and the plate 80 define an upper gas collection chamber 82. Attached to the plate 80 and in fluid communication with the gas separation chamber 82 is a pipe 84. The other end of the pipe 84 is connected to a conventional electrically operated solenoid valve 86. The other side of the valve 86 is connected to a vent pipe 88.

Attached to the sleeve 78 and in fluid communication with the chamber 82 is a conventional gas pressure sensor 90. The pressure sensor 90 is connected to the solenoid valve 86 through a pressure controller 92. The solenoid valve 86 can therefore be operated in response to changes in the pressure of gas in the gas collection chamber 82. By selectively releasing collected contaminating gas via valve 86, pressure throughout the hot path of the exchanger 18 is controlled.

Also attached to the sleeve 78 is a conventional liquid level sensor 94, representatively including a float 96 extending into the chamber 82. The liquid level sensor 94 is connected to the valve 56 via a conventional liquid level controller 98. The valve 56 can therefore be operated in response to changes in the level of liquid in the gas collection chamber 82.

Disposed within the coolant chamber 32 is a conventional liquid level sensor 100 which is connected to a solenoid valve 102 via a liquid level controller 104. The solenoid valve 102 can therefore be operated in response to changes of the coolant level in the coolant chamber 32 to maintain the desired level of liquid coolant in the chamber and therefore a desired amount of heat exchange between the coolant and the liquid carbon dioxide in the tubes 38. The solenoid valve 102 receives a flow of liquid carbon dioxide via flow line 106 from the holding reservoir 60.

At the cold path outlet 36 from the coolant chamber 32, a pressure regulator valve 108 regulates the flashed coolant flow rate through outlet 36 to maintain a selected pressure in the coolant chamber 32. The regulator valve 108 discharges flashed coolant flow to flow line 110 which is directed to a carbonation process (not shown). Optionally, the flow line 110 passes in heat exchange relation with the source flow line 14 through the heat exchanger 112, whereby the source flow is pre-cooled. Optionally, a regulator valve 114 may be placed in the source flow line 14 to control the source flow in response to the pressure in line 110 and therefore in response to the flashed coolant flow or carbonation flow discharging through line 110.

Operation of the system 10 will now be considered. The lower chamber 52, the tubes 38 and the upper chamber 76 are filled with liquid carbon dioxide. Liquid carbon dioxide coolant is delivered to the coolant chamber 32 through the pipe 34. The coolant chamber 32 is maintained at a relatively reduced pressure such that the liquid coolant in the chamber 24 boils, thereby absorbing heat from the liquid carbon dioxide in the tubes 38. Gaseous carbon dioxide coolant exits the coolant chamber 32 through the pipe 36. The temperature of the coolant in the chamber 32 is maintained at a relatively constant selected temperature by operating the coolant chamber as a flash chamber, as further discussed below. Coolant temperature is controlled so that the temperature of the liquid carbon dioxide in the tubes 38 is below that which is necessary to condense gaseous carbon dioxide at a selected pressure.

At the hot path inlet 16, relatively impure gaseous carbon dioxide is introduced that contains at least one contaminating gas having a lower condensation temperature than the liquid carbon dioxide, such as oxygen and nitrogen which, at a pressure of between approximately 70 and 1050 psig, have corresponding condensation temperatures of approximately $-69.9°$ and $87.8°$ F., respectively. Preferably, the pressure in the tubes 38 is between approximately 225 and 300 psig. This source carbon dioxide gas is delivered to the gas distributor 62 through the inlet pipe 16. For illustration purposes, assume that the carbon dioxide gas is at a pressure of approximately 250 psig. Since the carbon dioxide gas at that pressure will condense at approximately $-8°$ F., the coolant system is set so that the liquid carbon dioxide in the tubes 38 is below $-8°$ F. The degree of the temperature below $-8°$ F. will determine the gradient of the heat flow inside the tubes 38 from gaseous carbon dioxide to the liquid carbon dioxide.

As the gaseous carbon dioxide emerges from the holes in the perforated surface 64 of the gas distributor 62 it forms bubbles which float upwardly through the liquid carbon dioxide in the lower chamber 52, the tubes 38 and the upper chamber 76. As the bubbles of gaseous carbon dioxide pass through the cooler liquid carbon dioxide, the gaseous carbon dioxide undergoes heat exchange with the liquid carbon dioxide, i.e. heat is transferred from the gas to the liquid. When sufficient heat has been removed from the gas (the latent heat of vaporization) the gas will condense into the liquid carbon dioxide.

Since the carbon dioxide source gas also contains contaminating gas with a lower temperature of condensation, and a different latent heat of vaporization, the contaminating gas requires a lower temperature and a different amount of heat transfer to condense than does the gaseous carbon dioxide. Therefore, the carbon dioxide will condense before the contaminating gases, such as oxygen and nitrogen, will condense. The contaminating gas will therefore remain in a gaseous state, whereas the carbon dioxide will liquefy.

The temperature of the coolant in the coolant chamber 32 should therefore be below the condensation temperature of carbon dioxide, but greater than the condensation temperature of the contaminating gas. Furthermore, the coolant temperature should be sufficiently below the condensation temperature of the gaseous carbon dioxide so that sufficient heat transfer occurs inside the tubes 38 between the gaseous carbon dioxide and the liquid carbon dioxide between the time a gas bubble leaves the gas distributor 62 and the time the gas bubble reaches the surface of the liquid carbon dioxide in the upper chamber 24, preferably before the bubble passes the plate 42.

It will therefore be appreciated that as a gaseous bubble travels upwardly through the liquid carbon dioxide inside the tubes 38, the gaseous carbon dioxide within the bubble gradually condenses. It will also be understood that the contaminating gas which has a lower temperature of condensation does not substantially condense, but rather remains a gas. At a point along the travel of the gaseous bubble upwardly through the liquid carbon dioxide, all of the gaseous carbon dioxide will have condensed out of the bubble leaving only the gaseous contaminating gas.

The contaminating gas bubble is permitted to float to the top of the liquid carbon dioxide in the upper chamber 24 where it collects in the gas collection chamber 82. The diameter of the gas separation chamber 82 is smaller than the diameter of the upper chamber 76 so as to reduce the surface area of the liquid carbon dioxide in the upper chamber 76 that is exposed to the contaminating gas, thereby to reduce the possibility for the contaminating gas to enter into solution in the liquid carbon dioxide.

As the contaminating gas collects in the gas collection chamber 82, the pressure of the gas contained therein will increase. The pressure sensor 90 senses the pressure of the gas in the gas collection chamber 82, and the controller 92 actuates the valve 86 to permit gas to escape from the collection chamber 82 at a predetermined pressure. The pressure of the gas in the gas collection chamber 82 can thereby be maintained at a predetermined level.

Inside the tubes 38, as the gaseous carbon dioxide condenses from the gaseous bubbles into the liquid carbon dioxide, the volume of the liquid carbon dioxide increases, and therefore the level of liquid carbon dioxide rises into the gas collection chamber 82. As it does so, the float 96 floats on the surface of the liquid carbon dioxide. When the level of the liquid carbon dioxide reaches a predetermined level, the float actuates the level sensor 94 and the level controller 98 opens the valve 56 to permit liquid carbon dioxide to escape from the lower chamber 52 through the pipes 54, 58. The baffle plate 66 is provided to reduce the turbulence in the liquid carbon dioxide adjacent the pipe 54 so as to reduce the possibility of withdrawing entrained gas in the liquid carbon dioxide as it is removed from the lower chamber 52.

As the level of the liquid carbon dioxide falls in the gas collection chamber 82, the float 96 follows the liquid surface downwardly, actuating the level sensor 94 and causing the level controller 98 to throttle the valve 56, thus maintaining a predetermined level. It will therefore be appreciated that the level of the liquid carbon dioxide can be maintained at a desired predetermined level. It will also be understood that virtually pure liquid carbon dioxide is produced in a continuous process using the heat exchanger 18.

The holding reservoir 60 receives the relatively pure flow of liquid carbon dioxide from line 58. The reservoir 60 is in flow communication along line 106 with the coolant chamber 32 of exchanger 18, with flow along line 106 being regulated by solenoid valve 102. Thus, liquid carbon dioxide is introduced at inlet 34 into the exchanger cold path, i.e. the coolant chamber 32. The cold path of the exchanger is operated essentially as a flash chamber under selectively reduced pressure, relative to that in reservoir 60, such that as liquid enters the reduced pressure environment of the chamber 32 vigorous evaporation of the liquid carbon dioxide coolant takes place. This condition provides two key advantages. First, a highly efficient heat transfer condition is established. Second, a substantially uniform coolant temperature within the chamber 32 may be selected by control of the flashing pressure.

Representatively, the liquid carbon dioxide from the reservoir 60 will have initial saturated liquid conditions of about $-12°$ F. at about 234 psig; whereas, once inside the coolant chamber of the exchanger, a substantially reduced pressure, preferably about 170 psig, will cause a temperature to result of about $-28°$ F. due to evaporative cooling during flashing. The term "flash" and similar terms as used herein are intended to refer to vaporization of a volatile liquid by sudden reduction in pressure corresponding to superheated liquid conditions. The liquid level 101 inside the coolant chamber 32 is preferably maintained so as to substantially cover the tubes 38. Above the liquid coolant level 101, vaporized or flashed carbon dioxide coolant is vented at the outlet 36. Optionally, a conventional accumulator (not shown) may be interposed at the coolant outlet 36 to separate entrained liquid droplets from the flashed vapor. At the cold path outlet 36, the flashed flow is directed along line 110 to a conventional brewery carbonation process (not shown) subject to conventional pressure regulator 108 which regulates the flow in line 110 to substantially maintain selected pressure and flashing conditions in the exchanger coolant chamber 32.

In operation of the system 10, the regulator 108 provides a direct method of controlling the cold path temperature within the coolant chamber 32 and therefore provides a way of controlling the rate of heat exchange between the hot and cold paths in the exchanger. The lower the pressure in the coolant chamber, the more vigorous the rate of evaporation or flashing, and the lower the temperature achieved in the coolant liquid. The liquid level 101 inside the coolant chamber is monitored by the conventional level sensor 100 which in turn is in communication with solenoid valve 102 via controller 104 such that when level 101 drops below a predetermined minimum level, valve 102 is actuated to increase coolant flow along line 106. Conversely, if the liquid level 101 rises above a predetermined maximum level, then valve 102 reduces flow along line 106. Since the coolant chamber 32 is operated as a flash chamber, the liquid level 101 is maintained below the level of the coolant outlet 36.

It will be noted that under these representative operating conditions, carbonation flow along line 110 will be at a temperature of about $-28°$ F., whereas a preferred temperature in a brewery carbonation process is about 35° F. Offgas from fermentation tanks as discussed above in connection with source 12 typically will be at about 110° F., whereas a preferred exchanger inlet temperature for the source gas is about 35° F. Thus, it is preferred to preliminarily cool the source gas from source 12 by passing the source gas along line 14 in heat exchange relation at heat exchanger 112 with the carbonation flow along line 110. Alternatively, though not preferred, precooling may be accomplished by passing the source gas in heat exchange relation with the exterior surface of exchanger 18.

The system 10, it will be noted, is inherently input following, i.e. the carbonation flow output along line 110 will generally follow changes or perturbations in the source flow in line 14. However, in many cases the source flow of impure carbon dioxide gas will be substantially constant over time in a commercial scale brewery operation, whereas carbonation requirements may vary considerably over time due to interruptions in the associated beverage packaging operation. A preferred way of accommodating such varied demand for carbonation flow is to provide a solenoid valve 114 on source line 14 such that when pressure increases in line 110 due to diminished carbonation requirements, source flow is correspondingly diminished at valve 114 with source gas being correspondingly accumulated in the source reservoir 12.

Additionally, reservoir 60 is of sufficient capacity to accommodate relatively minor variation in carbonation flow demand. In other words, the reservoir serves as a buffer so that source flow along line 14 may be maintained substantially constant while carbonation flow from line 110 undergoes routine, minor oscillations depending on carbonation useage.

Although the present invention has been described in conjunction with preferred embodiments, it is to be understood that modifications and variations may be utilized without departing from the principles and scope of the invention as defined by the following claims.

What is claimed is:

1. A method for selectively condensing carbon dioxide from a source gas flow, comprising merging source carbon dioxide after liquification and separation from noncondensed contaminating gases into evaporating liquid carbon dioxide coolant so as to preclude the need for intermediate conventional refrigeration apparatus, including:

providing a quantity of liquid carbon dioxide in a vertical configuration including, in ascending order, a lower removing region, a gas distributing region, a condensing region, and a gas collecting region;

introducing said flow of source gas into said gas distributing region;

removing heat from said liquid carbon dioxide within said condensing region at a rate sufficient to selectively condense substantially all carbon dioxide from said flow of source gas therein;

collecting noncondensed gas in said gas collecting region;

removing carbon dioxide liquid from said lower removing region; and passing the removed carbon dioxide liquid as a coolant flow in indirect heat exchange relation with said condensing region while flashing at a rate sufficient to maintain said heat exchange relation.

2. The method of claim 1 further comprising controlling the temperature and pressure of said liquid carbon dioxide to remain above condensation conditions for all components of said source gas except carbon dioxide.

3. The method of claim 2 further comprising selecting said temperature and pressure in the respective ranges of about −14° to −8° F. and about 225 to 252 psig.

4. The method of claim 1 further comprising controlling said source flow in response to a demand signal for flashed coolant flow.

5. The method of claim 1 further comprising regulating the flashed coolant flow to maintain a selectively reduced pressure in said coolant flow so as to control the temperature of flashing and the rate of heat exchange.

6. The method of claim 5 further comprising preliminary cooling said source flow in heat exchange relation with said flashed coolant flow.

7. The method of claim 5 further comprising regulating the liquid coolant flow during said flashing in response to the rate of heat exchange.

8. The method of claim 1 wherein said source flow is at least partially derived from a fermentation process.

9. The method of claim 1 wherein said removed gaseous flashed coolant flow is used to carbonate beverages.

10. The method of claim 1 further comprising controlling said removing of carbon dioxide liquid in response to the level of liquid carbon dioxide above said condensing region.

11. The method of claim 1 further conprising controlling release of noncondensed gas from said gas collecting region in response to the pressure in said gas colection region to control the pressure in said liquid carbon dioxide.

12. Apparatus for selectively condensing carbon dioxide from a source gas flow, comprising means designed for merging source carbon dioxide after liquification and separation from noncondensed contaminating gases into evaporating liquid carbon dioxide coolant so as to preclude the need for intermediate conventional refrigeration apparatus, including:

a chamber configured to contain a quantity of liquid carbon dioxide in vertically arranged regions including, in ascending order, a lower removing region, a gas distributing region, a condensing region, and a gas collecting region;

inlet means for introducing said flow of source gas into said gas distributing region;

cooling means for removing heat from liquid carbon dioxide within said condensing region by indirect heat exchange;

said condensing region being configured such that substantially all carbon dioxide is selectively condensed from said flow of source gas while in direct heat exchange relation with liquid carbon dioxide therein;

collecting means for collecting noncondensed gas in said gas collecting region;

outlet means for removing carbon dioxide liquid from said lower removing region; and cold path means for passing removed carbon dioxide liquid through said cooling means while flashing at a rate sufficient to maintain said heat exchange relation.

13. The apparatus of claim 12 wherein said cold path means further comprise means for regulating the pressure in said cooling means to control the temperature of flashing in said cooling means.

14. The method of claim 13 wherein said cold path means further comprise means for regulating the liquid coolant flow to said cold path means, during flashing, in response to the rate of heat exchange.

15. The apparatus of claim 12 further comprising means for controlling flow to said inlet means in response to flashed coolant flow.

16. The apparatus of claim 12 further comprising means for preliminarily cooling flow to said inlet means by passing said flow in heat exchange relation with the flashed coolant flow.

17. The apparatus of claim 12 further comprising means for controlling release of noncondensed gas from said gas collecting region in response to the pressure in said gas collecting region to control the pressure in said liquid carbon dioxide.

18. The apparatus of claim 12 further comprising means for controlling said removing of carbon dioxide liquid from said lower removing region in response to the level of liquid carbon dioxide above said condensing region.

* * * * *